(12) United States Patent
Kawano et al.

(10) Patent No.: US 9,483,278 B2
(45) Date of Patent: Nov. 1, 2016

(54) ARRANGEMENT FOR SECURE INDEPENDENT OPERATING ENVIRONMENTS IN A COMPUTER

(71) Applicant: LENOVO (Singapore) PTE, LTD., New Tech Park (SG)

(72) Inventors: Seiichi Kawano, Sagamihara (JP); Kenji Oka, Yokohama (JP); Shinji Matsushima, Yokohama (JP)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 193 days.

(21) Appl. No.: 14/275,008

(22) Filed: May 12, 2014

(65) Prior Publication Data

US 2014/0337610 A1    Nov. 13, 2014

(30) Foreign Application Priority Data

May 11, 2013  (JP) .................................. 2013-100791

(51) Int. Cl.
  *G06F 9/44* (2006.01)
  *G06F 21/57* (2013.01)
  *G06F 21/62* (2013.01)
  *G06F 21/74* (2013.01)

(52) U.S. Cl.
  CPC ............. *G06F 9/441* (2013.01); *G06F 9/4418* (2013.01); *G06F 21/572* (2013.01); *G06F 21/6209* (2013.01); *G06F 21/74* (2013.01); *G06F 2221/2105* (2013.01); *G06F 2221/2149* (2013.01)

(58) Field of Classification Search
  CPC .......................... G06F 9/4411; G06F 9/4418
  See application file for complete search history.

(56) References Cited

U.S. PATENT DOCUMENTS

| | | | |
|---|---|---|---|
| 8,234,506 B2 | 7/2012 | Hajji et al. | |
| 2013/0227270 A1* | 8/2013 | Ting .................... | G06F 9/4411 713/100 |
| 2014/0032810 A1* | 1/2014 | Kanigicherla ........ | G06F 9/4843 710/314 |
| 2014/0089543 A1* | 3/2014 | Creager .............. | G06F 13/4081 710/110 |

FOREIGN PATENT DOCUMENTS

| | | |
|---|---|---|
| JP | 2001-256066 | 9/2001 |
| JP | 2005-011336 | 1/2005 |

* cited by examiner

*Primary Examiner* — Albert Wang
(74) *Attorney, Agent, or Firm* — Kunzler Law Group

(57) ABSTRACT

The present invention protects a memory image of an OS in a sleep state. A CPU executes a first OS or a second OS while switching there between. The first OS is loaded into a main memory, and the second OS is loaded into an auxiliary memory. The auxiliary memory may be connected to a chipset through a PCIe interface. The main memory and the auxiliary memory are configured such that, when one is in an active state where the right of access to the CPU is obtained, the other makes a transition to the sleep state where there is no right of access to the CPU while maintaining the memory image. In order to prevent one OS in the active state from accessing the main memory or the auxiliary memory in which the memory image of the other OS in the sleep state is stored, the BIOS may set a corresponding controller to disabled during a POST.

20 Claims, 6 Drawing Sheets

ARRANGEMENT FOR SECURE INDEPENDENT OPERATING ENVIRONMENTS IN A COMPUTER

FIELD

The present invention relates to a technique for creating a secure operating environment for computers, and further to a technique for creating independent operating environments that do not interfere with each other on a computer having multiple operating environments.

There are known techniques for switching amount and executing multiples operating systems (OSs) having respective characteristics in the same hardware environment of a computer. Such computer systems are known to access boot loaders of the multiple OSs sequentially at startup and to load all the OSs coexisting in the system into assigned logical memory blocks of a main memory.

SUMMARY

In a first embodiment, a computer capable of executing multiple operating systems has a processor, a first random access memory, a second random access memory, and system firmware. The processor may execute a first operating system or a second operating system. The first random access memory and the second random access memory are connected to different controllers.

A first operating system is loaded into the first random access memory, and a second operating system is loaded into the second random access memory. Upon resuming from a suspend state, the system firmware may make a transition of the first operating system to an active state while making a transition of the second operating system to a sleep state, or make a transition of the second operating system to the active state while making a transition of the first operating system to the sleep state.

In some embodiments, the operating system in the active state and the operating system in the sleep state are loaded in different random access memories, which improves security against data alteration. In addition, when the system is resumed from the suspend state, since the system firmware that obtained the right of access to the processor by performing power-on reset performs switching, operating environments can be switched without any changes in OS and hardware.

The first random access memory and the second random access memory may be connected to different controllers. However, they do not need to be physically separated as long as the system firmware can recognize them as different devices, i.e., they may be formed as a physically single memory module. The first random access memory may be set as a large-capacity main memory normally used by the computer, and the second random access memory may be set as a memory module smaller in capacity than the main memory and used as a peripheral device. The second random access memory may be a memory accessible from the processor by a memory mapped I/O method using addresses assigned to physical address space of the first random access memory.

When the system has a second controller for controlling the second random access memory, the system firmware can set the system to block access to the second controller from the first operating system during the transition of the first operating system to the active state. The second controller may be embedded in a chipset connected to the processor.

When the computer is booted from a power-off state, the system firmware in one embodiment sets the system to block access to the second controller from the first operating system. When this system has control of a first controller for the access to the first random access memory, the system firmware can set the system hardware to block access to the first controller from the second operating system during the transition of the second operating system to the active state.

The first controller may be a memory controller embedded in the processor. When the computer is resumed from the suspend state, the system firmware can set the system to block access to the first controller from the second operating system. Since the operating system cannot cancel the access prevention set by the system firmware, security against the alternation of the operating system in the suspend state can be ensured.

When permitting access to the second controller or the first controller, the system firmware may request a password. The system firmware can switch the first operating system and the second operating system between the active state and the sleep state by performing suspend and quick resume to resume the computer immediately from the suspend state.

In a further embodiment, the second random access memory is housed in a removable-type memory module. The term "removable-type" means that a user can attach or detach the memory module without opening the computer chassis. Therefore, a memory module of a type that is attached to or detached from a connector after the chassis is opened does not correspond to the removable-type in the present invention. The interface may be of a wireless type or a wired type using a connector or a cable. Thus, the memory module is of the removable type, and this can result in forming an operating environment of a secondary operating system on the multiple computers.

The memory module may include a nonvolatile memory for storing the second operating system. In this case, the second operating system can be loaded from the nonvolatile memory into the second random access memory. If the second random access memory is made up of nonvolatile memory cells, it can immediately create the operating environment of the second operating system on a computer as a connection destination while holding the memory image even during a period where the memory module is removed.

In a further embodiment, the system firmware can prevent access to any peripheral device selected from among multiple peripheral devices in the operating environment of the second operating system. The selected peripheral device can be a nonvolatile storage device or a communication device. According to this configuration, the operating environment of the second operating system can improve security more than the operating environment of the first operating system.

Described is a method of preventing an operating environment in an active state from affecting an operating environment in a sleep state on a computer having multiple operating environments. Also described is a method of protecting an operating environment in the sleep state without any changes in OS and hardware. According to embodiments disclosed herein, there can further be provided a method of creating, on a computer, an operating environment more secure than an ordinary operating environment. Further, according to certain embodiments, there can be provided a method of creating the same operating environment on multiple computers. Furthermore, there may be provided a computer and a computer program for realizing such a method.

DETAILED DESCRIPTION

[Outline of Operating Environments]

Operating environments realized in certain embodiments will be first described. The operating environments are configured with hardware and software of a computer. A CPU can switch among and run at least two or more OSs. A number of operating environments corresponding to the number of loaded OSs exist. As an example, two operating environments are created for a primary OS and a secondary OS. The respective operating environments of the computer bring different features to the computer.

For example, the operating environment of the primary OS may be suitable for content creation that enables input from a keyboard and a mouse, and the operating environment of the secondary OS may enable touch panel operation suitable for content browsing. Alternatively, the operating environment of the primary OS may be set as an environment that enables use of all peripheral devices but there remains a danger of information leakage and contamination with malware, and the operating environment of the secondary OS may be set to limit the use of some peripheral devices so that the environment will be secure though it remains inconvenient.

The operating environment of the primary OS may be set as a normally used environment, and the operating environment of the secondary OS may be set as an operating environment used to do special work. The operating environment of the primary OS and the operating environment of the secondary OS are so configured that when one is in an active state, the other will make a transition to a sleep state without fail. Since a memory image of an OS that configures an operating environment in the sleep state is maintained in the main memory or an auxiliary memory, the operating environment of the primary OS and the operating environment of the secondary OS can be switched in an extremely short time.

The main memory or the auxiliary memory that stores the memory image of the OS in the sleep state may be configured to be unable to be accessed from an OS in the active state. The CPU is shared in either operating environment, but the main memory into which the primary OS is loaded and the auxiliary memory in which a memory image of the secondary OS is stored are independent of each other from the standpoint of the CPU.

Although all peripheral devices may be able to be used in either operating environment, the operation of some peripheral devices may be restricted in the operating environment of the secondary OS. An application may be shared in two operating environments or independent of each other, or both may coexist. The secondary OS and the auxiliary memory may be in a memory module removable from the computer. The primary OS and the secondary OS may be stored in the operating environment of the primary OS or in the respective operating environments.

Figure 1:
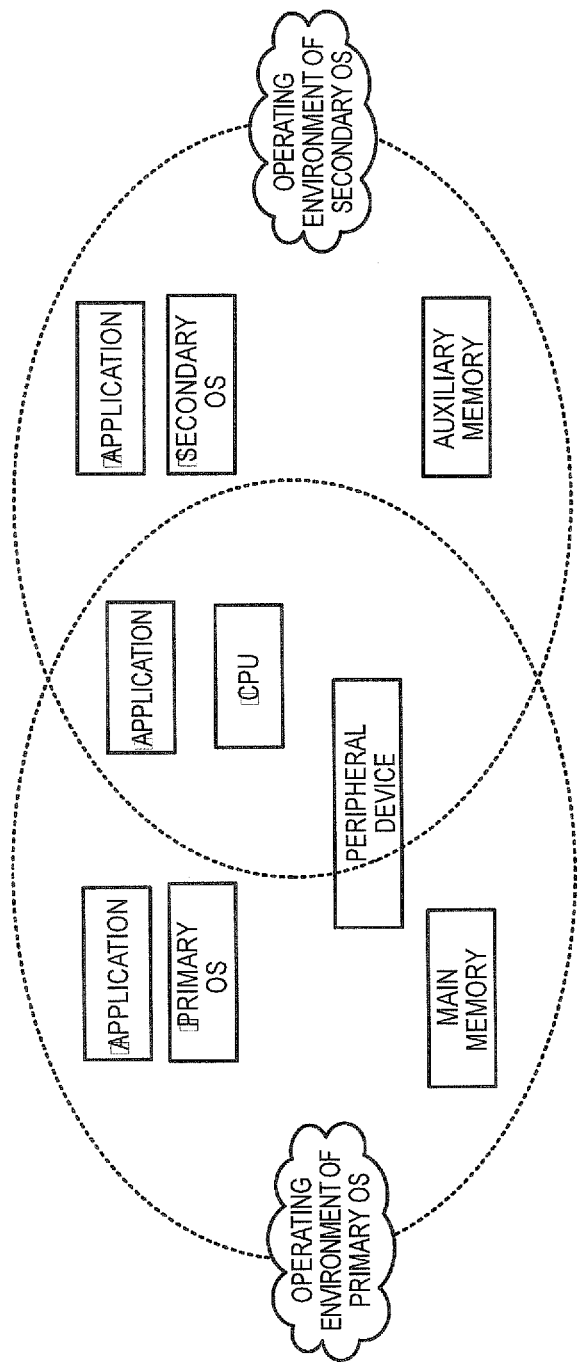
FIG. 1 is a diagram showing the outline of operating environments on a computer.
Figure 2:
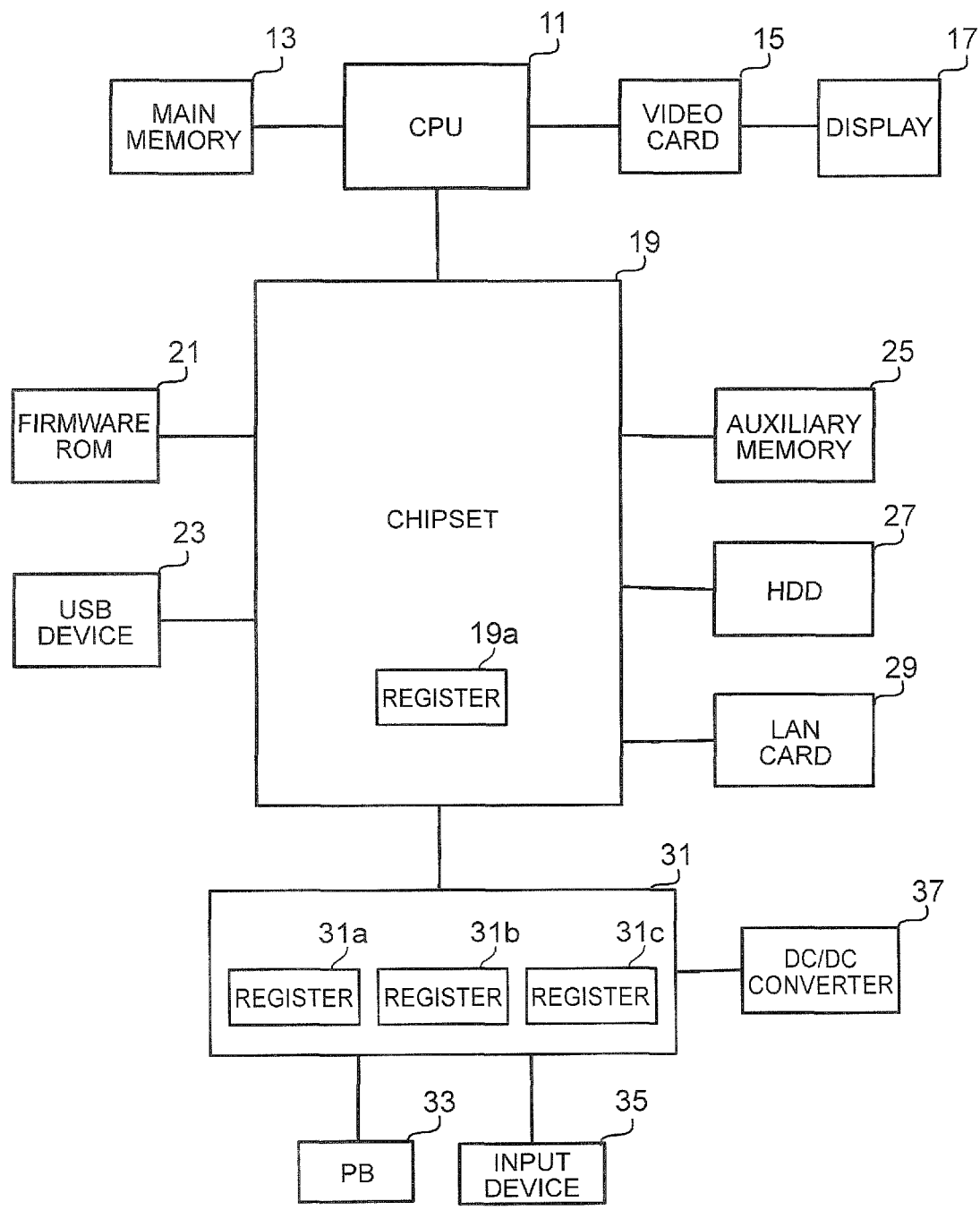
FIG. 2 is a functional block diagram showing a hardware configuration of the computer necessary to describe the present invention.
Figure 3:
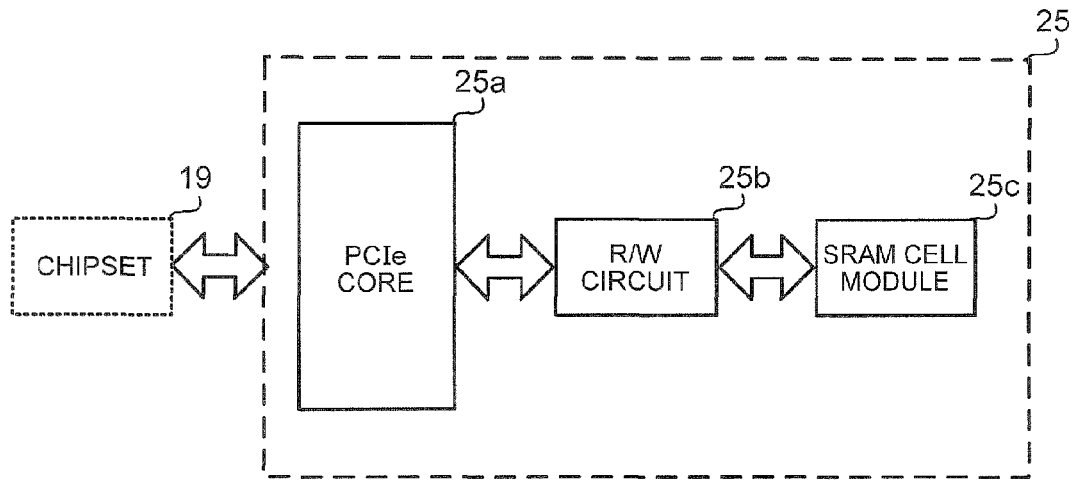
FIG. 3 is a functional block diagram showing an example of the configuration of an auxiliary memory 25.
Figure 4:
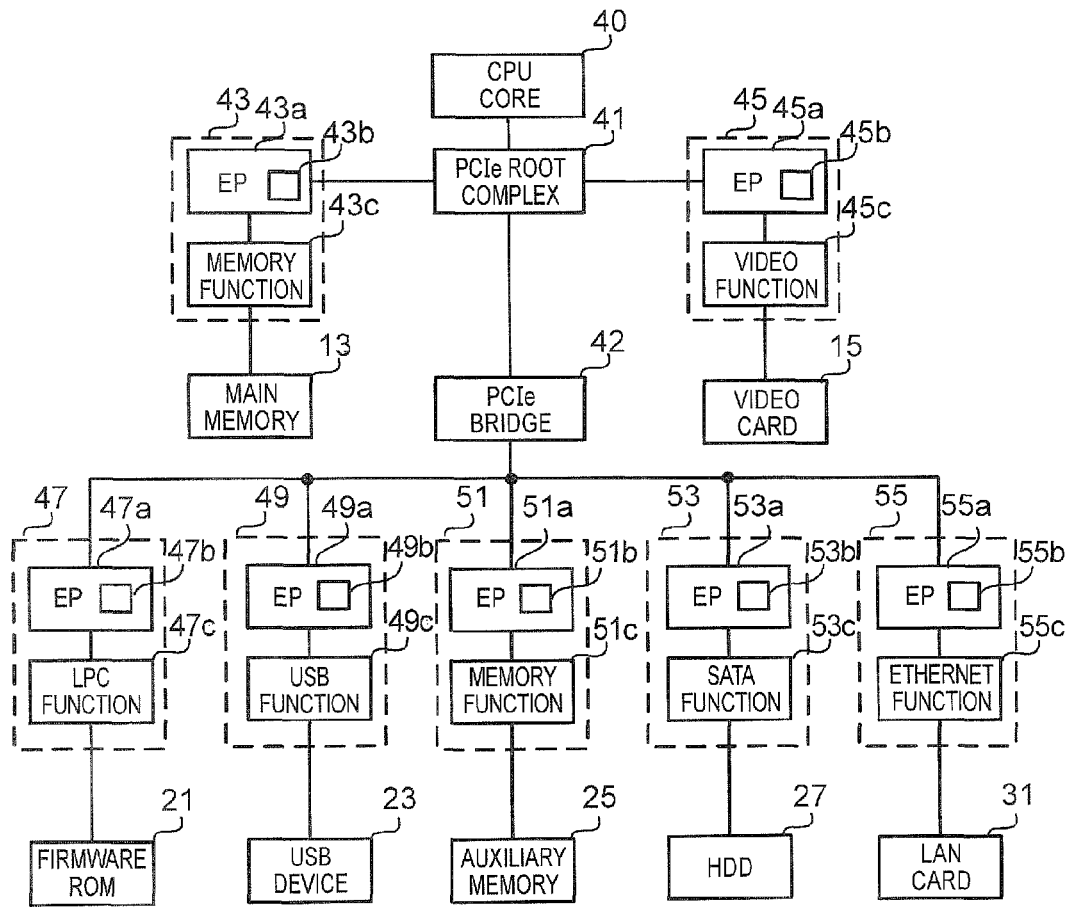
FIG. 4 is a functional block diagram showing an example of the configuration of a PCIe bus system in a computer 10.

FIG. 2 is a functional block diagram showing an example of the configuration of a computer 10 necessary to describe the present invention. FIG. 3 is a functional block diagram for describing an example of the configuration of an auxiliary memory 25. FIG. 4 is a functional block diagram for describing an example of the configuration of a PCIe bus system in the computer 10. A main memory 13 and a video card 15 are connected to a CPU 11. As an example, the CPU 11 may be an X86 architecture microprocessor or a microprocessor compatible with the X86 architecture.

The CPU 11 includes a memory controller 43 for controlling the operation of the main memory 13, a video controller 45 for controlling the operation of the video card 15, a memory management unit for converting a virtual address to a physical address, and the like. The main memory 13 is a volatile memory compliant with the DDR-SDRAM standards, and is connected to the CPU 11 in a dual channel structure. The capacity of the main memory 13 may be 8 GB as an example.

The CPU 11 directly accesses the main memory 13 to execute a program, and also directly accesses the auxiliary memory 25 to execute a program in a manner to be described later. The video card 15 generates image data to be displayed on a display 17. A chipset 19 is connected to the CPU 11 through a DMI (Direct Media Interface) bus. Controllers for controlling peripheral devices, such as an LPC (Low Pin Count) controller 47, a USB (Universal Serial Bus) controller 49, a memory controller 51 of a PCIe (PCI Express) standard, a SATA (Serial Advanced Technology Attachment) controller 53, and an Ethernet (registered trademark) controller 55, are embedded in the chipset 19. The chipset 19 further includes an ACPI register 19a for controlling the power state of the computer 10.

A firmware ROM 21 is connected to the LPC controller 47, a USB device 23 is connected to the USB controller 49, the auxiliary memory 25 is connected to the memory controller 51, an HDD 27 is connected to the SATA controller 53, and a LAN card 29 is connected to the Ethernet (registered trademark) controller 55. The firmware ROM 21 stores system firmware such as BIOS or UEFI as an alternative of BIOS.

In the present invention, although it is assumed that OSs and programs that run under the environments of the OSs are likely to be infected by a malware, a secure operating environment is created on the assumption that the BIOS is written in a protected area of the firmware ROM 21 called a boot block and consistency is always verified during the operation to confirm that the BIOS is not falsified.

The hardware of the computer 10, the BIOS, and the OSs may conform to the ACPI (Advanced Configuration and Power Interface) standard. The BIOS may include code for switching between operating environments of a system for carrying out the present invention as well as POST (Power On Self-Test) and authentication when the power to the computer is turned on, code for protecting memory images in the sleep state, and code for creating a secure operating environment.

In the depicted embodiment, the HDD 27 is a boot drive for storing the OSs and application programs executed by the CPU 11. As an example, the HDD 27 stores two kinds of OSs, namely a primary OS and a secondary OS. The primary OS and the secondary OS may be stored in the same boot partition, or in different boot partitions. The primary OS is loaded into the main memory 13 and the secondary OS is loaded into the auxiliary memory 25 by means of the BIOS. Here, loading of a program means that the program stored in the HDD 27 is stored in the main memory 13 or the auxiliary memory 25 in an executable state so that the CPU 11 will execute the program. In another example, the secondary OS is loaded from a nonvolatile memory in a removable memory module.

An EC 31 is a microcomputer composed of a CPU, a ROM, a RAM, and the like to execute a program for the management of the computer 10, such as the temperature and the power supply of the computer 10, in an operating environment independent of the CPU 11. The EC 31 operates in either the operating environment of the primary OS or the operating environment of the secondary OS. The EC 31 includes an input controller, and a power button 33 and an input device 35 such a keyboard and a pointing device are connected to the EC 31. The EC 31 also includes registers 31a to 31c capable of maintaining memory even in a suspend state.

The registers 31a to 31c may be set by an OS or the BIOS, and referred to by the BIOS or the EC 31 when an operating environment is created or changed. The register 31a sets a boot flag indicative of the type, namely cold boot [0] or warm boot [1]. The register 31b sets a resume flag indicative of the type, namely normal resume [0] to resume in response to receiving an event from a user, or suspend and quick resume [1]. Suspend and quick resume will be described below. The register 31c sets an environment flag indicative of an OS to which the right of access to the CPU 11 is transferred, namely either primary OS 103 [0] or secondary OS 111 [1]. A DC/DC converter 37 supplies power to the computer 10. The EC 31 controls the operation of the DC/DC converter 37 to change the power state of the computer.

One embodiment of a configuration of the chipset 19 illustrated in FIG. 2. The kinds of peripheral device interfaces, and the connection methods do not limit the present invention. It should be noted that adoption of any other configuration obvious to those skilled in the art to be able to carry out the present invention falls within the scope of the present invention. For example, although the main memory 13 and the video card 15 are connected to the CPU 11, they may be connected to the chipset. Further, the chipset is illustrated as one PCH, but a two chipset architecture such as MCH and ICH may be employed.

In FIG. 3, the auxiliary memory 25 includes a PCIe core block 25a, a R/W circuit 25b, and an SRAM cell module 25. The PCIe core block 25a supports a transaction layer for processing a PCIe protocol, a data link layer, and a physical layer. The R/W circuit 25b decodes data received from the PCIe core block 25a and outputs a read/write control signal for the SRAM cell module 25c. The R/W circuit 25b outputs read data received from the SRAM cell module 25c to the PCIe core block 25a. The SRAM cell module 25c is configured to include a memory array of an SRAM and a drive circuit. As an example, the capacity of the SRAM cell module 25c may be 2 GB.

[PCIe System]

The bus system of the computer 10 is configured based on PCIe. In FIG. 4, a PCIe root complex 41 is connected to a core 40 of the CPU 11. The PCIe root complex 41 includes three ports to which the memory controller 43, a PCIe bridge 42, and the video controller 45 are connected, respectively.

The LPC controller 47, the USB controller 49, the memory controller 51, the SATA controller 53, and the Ethernet (registered trademark) controller 55 are connected to the PCIe bridge 42. Here, these controllers 43 to 55 are called PCIe controllers. The PCIe controllers are made up of end points 43a to 55a and functions 43c to 55c, respectively. The end points 43a to 55a include configuration registers 43b to 55b, respectively. Peripheral devices such as the main memory 13, the video card 15, the firmware ROM 21, the USB device 23, the auxiliary memory 25, the HDD 27, and the LAN card 31 are connected to the functions 43c to 55c, respectively.

Figures 5A, 5B:
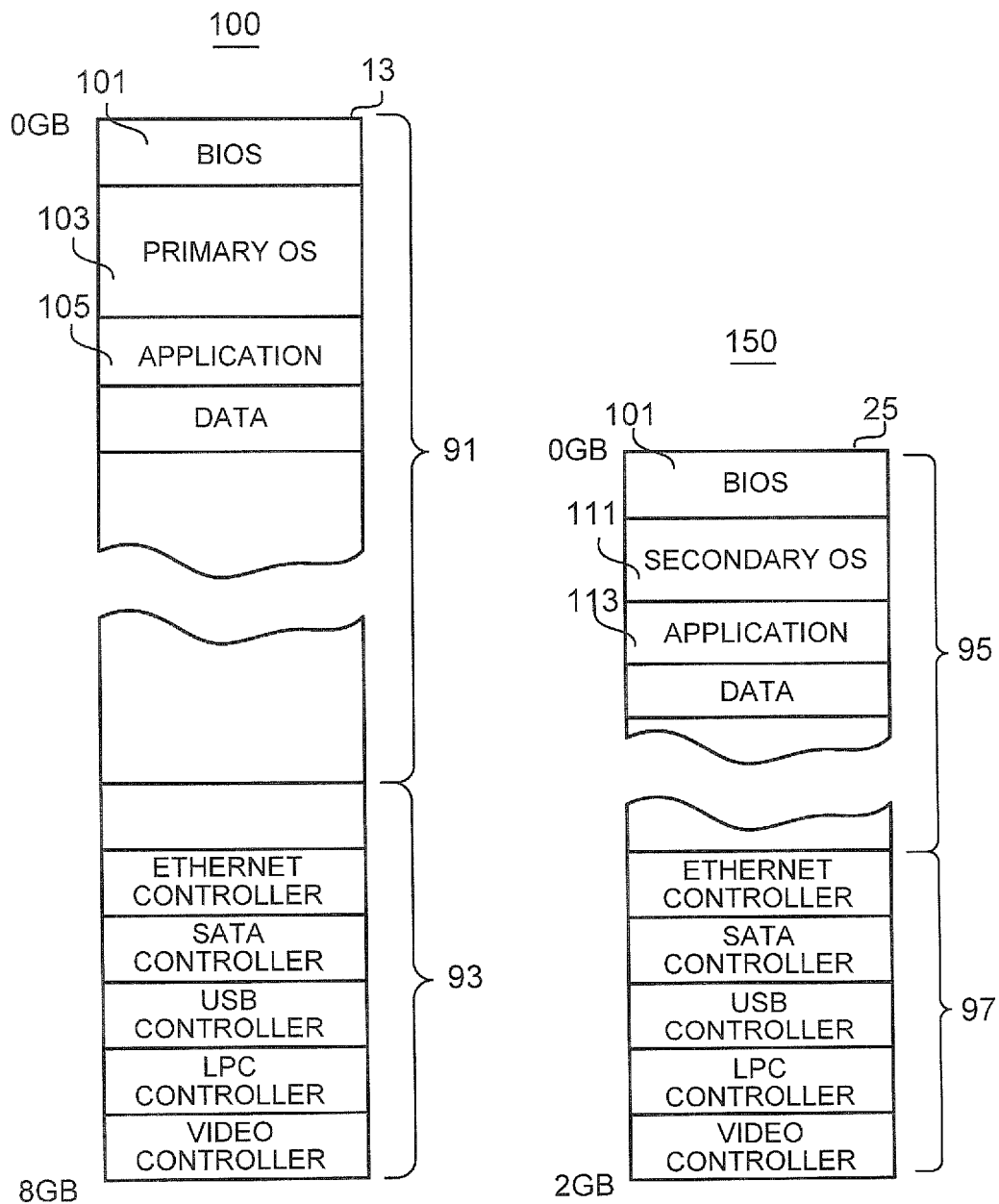
FIGS. 5A and 5B contains diagrams showing physical address spaces for a main memory 13 and the auxiliary memory 25.

FIG. 5A and FIG. 5B contains diagrams showing physical address spaces configured by BIOS 101 in the main memory 13 and the auxiliary memory 25. A PCIe device supports four address spaces, namely memory space, I/O space, configuration space, and message space. Methods in which the CPU accesses a peripheral device include a memory-mapped I/O method and a port-mapped I/O method. In the depicted embodiment, the CPU 11 adopts the memory mapped I/O method. In the memory mapped I/O method, the CPU 11 makes the main memory 13 and the PCIe controller coexist in one physical address space to access, where a read/write command (load/store command) to the main memory 13 may also be used to access the peripheral devices.

FIG. 5A is a diagram for describing physical address space 100 of the main memory 13, and FIG. 5B is a diagram for describing physical address space 150 of the auxiliary memory 25. When selecting the main memory 13 as the operating environment of the primary OS 103, the BIOS 101 configures the physical address space 100, while when selecting the auxiliary memory 25 as the operating environment of the secondary OS 111, the BIOS 101 configures the physical address space 150. Note that the configuration may also be such that the auxiliary memory 25 is selected as the operating environment of the primary OS 103 to configure the physical address space 150 and the main memory 13 is selected as the operating environment of the secondary OS 111 to configure the physical address space 100.

Although a procedure for using these physical address environments 100 and 150 will be described later, the BIOS 101 sets one operating environment to the active state and the other address space to the sleep state after creating the physical address spaces 100 and 150 in the main memory 13 and the auxiliary memory 25 at boot time as shown in FIG. 5A and FIG. 5B, respectively. Here, the operating environment in the sleep state means a state of the primary OS 103 or the secondary OS 111 from which the right of access to the CPU 11 is deprived by the BIOS 101 while maintaining the storage of memory images in the main memory 13 or the auxiliary memory 25 when the computer 10 is in a power-on state. On the other hand, the operating environment in the active state means a state of the primary OS 103 or the secondary OS 111 that receives the right of access to the CPU 11 from the BIOS 101 when the computer 10 is in the power-on state.

The primary OS 103 and the secondary OS 111 do not recognize which of the main memory 13 and the auxiliary memory 25 each OS is loaded into. The primary OS 103 and the secondary OS 111 recognize only the physical address spaces 100 and 150 assigned respectively to map respective virtual address spaces in order to execute processes. The primary OS 103 may provide an ordinary operating environment of the computer 10, and the secondary OS 111 may provide a special operating environment capable of improving security and corresponding to a user interface such as a touch screen.

In the memory mapped I/O method, a memory address range 91, 95, and a PCIe device address range 93, 97 are allocated by the BIOS 101 in the entire address range of each of the main memory 13 and the auxiliary memory 25, respectively. Therefore, the memory address range 91, 95 of the main memory 13 or the auxiliary memory 25, which is available to the primary OS 103 or the secondary OS 111, is limited by the PCIe device address range 93, 97 configured. A known technique in which the OSs and the chipset extend the limited physical address range may be employed.

Upon completion of the boot, memory images of the BIOS 101, the primary OS 103, an application 105, and the like are stored in the memory address range 91, and memory images of the BIOS 101, the secondary OS 111, an application 113, and the like are stored in the memory address range 95. The BIOS 101 to be stored in the memory address ranges 91 and 95 is loaded from the firmware ROM 21 into the main memory 13 or the auxiliary memory 15 so that the BIOS 101 will be shadowed in a stage where POST progresses to some extent.

When booting the primary OS 101 or the secondary OS 111, the BIOS 101 assigns address blocks of the PCIe device address ranges 93 and 97 to the PCIe controllers 43 to 55, and writes the address ranges to the configuration registers 43b to 55b. Address blocks are assigned to the video controller 45, the LPC controller 47, the USB controller 49, the SATA controller 53, and the Ethernet (registered trademark) controller 55 in the PCIe device address ranges 93 and 95.

The BIOS 101 does not assign an address block to the memory controller 51 in the physical address space 100 of the main memory 13. Therefore, programs cannot access the auxiliary memory 25 in the operating environment of the primary OS 103. The BIOS 101 does not assign an address block to the memory controller 43 in the physical address space 150 of the auxiliary memory 25. Therefore, programs cannot access the main memory 13 in the operating environment of the secondary OS 111.

In the ACPI standard, multiple power states are defined, and the computer 10 may make a transition to any one of power-on state (S0 state), suspend state (S3 state) for supplying power only to a device necessary to write operation contents to the main memory 13 and hold the stored contents in the main memory 13, and a device necessary to restart the computer 10, hibernation state (S4 state) for supplying power only to a device necessary to write the operation contents to the HDD 27 or any other nonvolatile memory and to restart the computer 10, and soft off or power-off state (S5 state) for supplying power only to the device necessary to restart the computer 10. In the embodiment, the system context that configures the operating environment of the secondary OS 111 in the suspend state is stored in the auxiliary memory 25, and power is also supplied to a device necessary to maintain the memory.

In general, the system is resumed from the suspend state to the power-on state with a user operation or based on a schedule set by the system after a certain period of time has elapsed since transition to the suspend state, while in one embodiment, a method called suspend and quick resume is adopted, where the system is resumed immediately after the system makes a transition to the suspend state. The suspend and quick resume is intended to perform power-on reset of the CPU 11 in order to transfer the right of access to the CPU 11 once to the BIOS. When the system is resumed immediately after transition to the suspend state for a moment, the BIOS 101 changes the operating environment of the CPU 11 or configures settings for blocking access to a PCIe controller.

Figure 6:
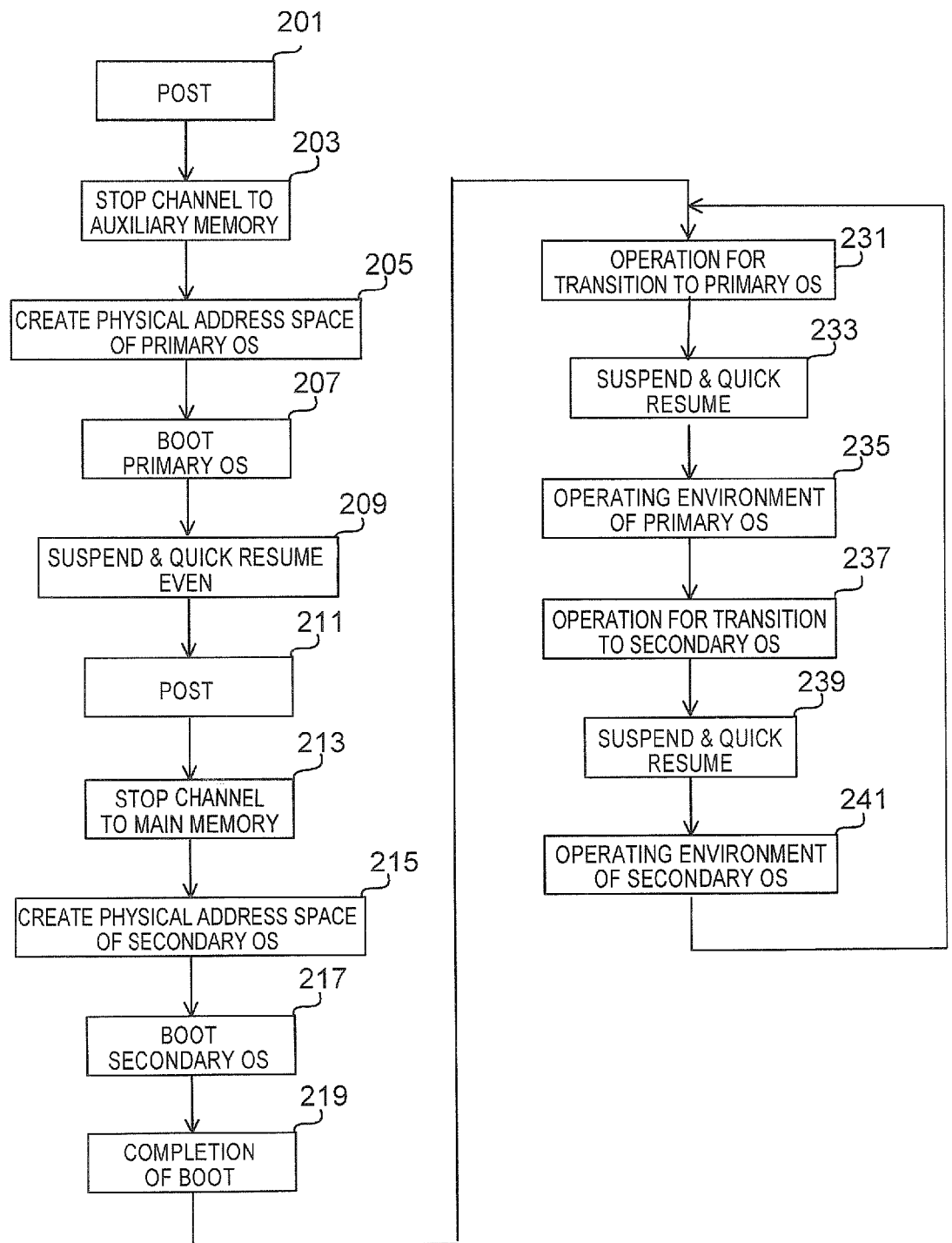
FIG. 6 is a flowchart showing an operation procedure of the computer 10.

FIG. 6 is a flowchart showing an operation procedure of the computer 10. In block 201 where the computer 10 is in the power-off state, when the power button 33 is pressed, power is supplied to the computer 10 to start a boot sequence. Boot from the power-off state is called cold boot, and the BIOS 101 completes all POST for all PCIe controllers. On the other hand, boot from the suspend state is called warm boot, and the BIOS 101 omits a part of the POST or simplifies the POST.

When the power is stabilized, the CPU 11 that is power-on reset initializes the internal cache and register. The EC 31 that is reset also initializes the registers 31a to 31c. The boot flag in the initialized register 31a indicates cold boot [0], the resume flag in the register 31b indicates suspend and quick resume [1], and the environment flag in the register 31c indicates primary OS 103 [0].

The CPU 11 accesses the first address of the firmware ROM 21 to execute the BIOS 101 in order. The BIOS 101 refers to the register 31c to recognize the main memory 13 as a loading destination. The CPU 11 reads the BIOS 101 from the firmware ROM 21 into the memory address range 91 along the way to shadow the BIOS 101. The address of the firmware ROM 21 is mapped to an address block of the main memory 13 to store the BIOS 101, and after that, the CPU 11 reads code from the main memory 13 when specifying the address of the firmware ROM 21 to execute the BIOS 101.

In block 203, the BIOS 101 refers to the register 31a to complete all POST for detecting, initializing, and setting the PCIe controllers mounted in the computer 10. When recognizing the capacity and address of the main memory 13, the BIOS 101 starts creating the physical address space 100 including the memory address range 91, and the PCIe device address range 93 in which address blocks are assigned to the PCIe controllers.

The BIOS 101 sets the assigned address blocks in each of the configuration registers 43b to 55b. At this time, the setup of the memory controller 51 for controlling the auxiliary memory 25 is omitted and set to disabled. Therefore, the BIOS 101 does not assign a memory block in the PCIe device address range 93 to access the memory controller 51. An address block may be assigned to a PCIe controller by the BIOS 101 alone. Therefore, the primary OS 103 that received the right of access to the CPU 11 from the BIOS 101 does not recognize the memory controller 51, so that the primary OS 103 cannot access the auxiliary memory 25 through the physical address space 100.

Alternatively, the BIOS 101 may set the memory controller 51 to disabled or assign an address block after the completion of the setup of the memory controller 51. In any case, the BIOS 101 performs processing for blocking the primary OS 111 from accessing the auxiliary memory 25 before transferring the access right to the primary OS 103. In block 205, the BIOS 101 creates the physical address space 100 shown in FIG. 5A, and passes it to the primary OS 103. The physical address space 100 is used in the operating environment of the primary OS 103.

Code for booting the primary OS 103 and code for booting the secondary OS 111 are written in a boot sector of the HDD 27. Upon completion of the POST, the BIOS 101 refers to the environment flag [0] in the register 31c to transfer control to the code for booting the primary OS 103 in the boot sector in block 207. The CPU 11 refers to the physical address space 100 to write modules of the primary OS 103 read in order from the HDD 27 to predetermined addresses of the main memory 13.

At this time, the primary OS 103 loads, into the memory address range 91, device drivers of the PCIe controllers detected by the BIOS 101. However, since the memory controller 51 is not recognized, the device driver is not loaded. When the completion of booting the primary OS 103 is detected, the primary OS 103 or the application 105 that runs on the primary OS 103 generates a switching event to perform suspend and quick resume in block 209. The switching event may be input and generated by the user from the input device 35. When the operating environment of the secondary OS 111 is not created, the boot is completed before the generation of the switching event.

In response to the generation of the switching event, the primary OS 103 stores, in the memory address range 91, information necessary to configure the operating environment of the primary OS 103, such as the system context held by the CPU 11, the registers of the peripheral devices, and the volatile memory, to which power supply is stopped in the suspend state. Upon completion of preparation for suspend, the primary OS 103 sets boot flag [0] indicative of cold boot in the register 31a of the EC 31 through the BIOS 101, sets resume flag [1] indicative of suspend and quick resume in the register 31b, and sets environment flag [1] in the register 31c to indicate that the secondary OS 111 is to be booted.

Then, the primary OS 103 sets the suspend state as a transition destination in the ACPI register 19a of the chipset 19 through the BIOS 101. The chipset 19 with the suspend state set in the ACPI register 19a instructs the EC 31 to make a transition of the power supply of the system to the suspend state. The EC 31 refers to the register 31b when making the transition to the suspend state. After confirming the resume flag [1] set in the register 31b, the EC 31 makes a transition of the power supply to the suspend state for a moment to power-on reset the CPU 11, and immediately resumes to the power-on state.

During the suspend state, power for the main memory 13 and the auxiliary memory 25 to store data and the power of the EC 31 are maintained. The CPU 11 that was power-on reset in block 211 executes the BIOS 101 from the first address in the same procedure as in block 201. The BIOS 101 refers to the environment flag [1] in the register 31c to select the auxiliary memory 25 as the loading destination. After referring to the register 31a to confirm the boot flag [0], the BIOS 101 completes all POST on the PCIe controllers. The CPU 11 reads the BIOS 101 from the firmware ROM 21 into the memory address range 95 along the way to shadow the BIOS 101.

In block 213, the BIOS 101 performs processing for preventing the secondary OS 111 from accessing the main memory 13. The BIOS 101 refers to the boot flag [0] in the register 31a to complete POST for detecting, initializing, and setting the PCIe controllers mounted in the computer 10. When recognizing the capacity and address of the auxiliary memory 25, the BIOS 101 starts creating the physical address space 100 including the memory address range 95 and the PCIe device address range 97 in which address blocks are assigned to the PCIe devices.

The BIOS 101 sets the assigned address blocks in each of the configuration registers 43b to 55b. At this time, the BIOS 101 performs processing for blocking access to the main memory 13 from the secondary OS 111 before transferring the access right to the secondary OS 111, such as to omit the setup of the memory controller 43 for controlling the main memory 13, to set it to disabled, or to prevent a memory block from being assigned to the PCIe device address range 97.

Therefore, the secondary OS 111 that received the right of access to the CPU 11 from the BIOS 101 does not recognize the memory controller 43, and hence the secondary OS 111 cannot access the main memory 13 through the physical address space 150. In block 215, the BIOS 101 creates the physical address space 150 shown in FIG. 5B, and passes it to the secondary OS 111. The physical address space 150 is used in the operating environment of the secondary OS 111.

When the POST is completed, the BIOS 101 refers to the environment flag [1] in the register 31c to transfer control to the code for booting the secondary OS 111 in the boot sector in block 217. The CPU 11 refers to the physical address space 150 to load, into predetermined addresses of the auxiliary memory 25, modules of the secondary OS 111 read in order from the HDD 27. At this time, the secondary OS 111 loads device drivers of the PCIe controllers detected by the BIOS 101 into the memory address range 95. However, since the memory controller 43 is not recognized, the device driver is not loaded.

In block 219, the boot of the primary OS 103 and the secondary OS 111 is completed, and the boot of the entire system is completed. At this time, the memory image of the primary OS 103 is stored in the main memory 13, but the primary OS 103 makes a transition to the sleep state where the access right is deprived. The secondary OS 111 that received the access right from the BIOS 101 and completed the boot makes a transition to the active state, so that the user may execute the secondary OS 111 and the application 113 to do computer work.

If the operation of the secondary OS 111 or the application 113 is not infected, it runs in the memory address range 95. Even if the secondary OS 111 or the application 113 is infected by a malware or damaged, since access to the main memory 13 from the operating environment of the secondary OS 111 is prevented, the memory image of the primary OS 103 that made the transition to the sleep state will be protected.

In block 231, the user operates the input device 35 to input a switching event to the computer 10 in order to make a transition to the operating environment of the primary OS 103. The secondary OS 111 that received the switching event in block 233 stores, in the memory address range 95, information for configuring the operating environment of the secondary OS 111, such as the system context held by the CPU 11, the registers of the peripheral devices, and the volatile memory, to which power supply is stopped in the suspend state. Upon completion of preparation for suspend, the secondary OS 111 sets boot flag [1] indicative of warm boot in the register 31a of the EC 31 through the BIOS 101, sets the resume flag [1] indicative of suspend and quick resume in the register 31b, and sets, in the register 31c, environment flag [0] indicative of making a transition of the operating environment to the primary OS 103.

Then, the secondary OS 111 sets the suspend state as the transition destination in the ACPI register 19a of the chipset 19 through the BIOS 101. The chipset 19 with the suspend state set in the ACPI register 19a instructs the EC 31 to make a transition of the system to the suspend state. The EC 31 refers to the register 31b when making the transition to the suspend state. After confirming the resume flag [1] set in the register 31b, the EC 31 makes a transition of the power supply to the suspend state to power-on reset the CPU 11, and immediately resumes to the power-on state.

The CPU 11 that is power-on reset executes the BIOS 101 from the first address. When referring to the register 31a and confirming the boot flag [1], the BIOS 101 performs an partial setup on the peripheral devices. Since the POST at warm boot is simplified, the POST is finished in a short time. The BIOS 101 refers to the environment flag [0] in the register 31c, determines the main memory 13 to be a memory as a return destination, and restores the system context, stored in the memory address range 91 in block 209, in the CPU 11, the PCIe controllers, and the peripheral devices. Since the restoration of the system context is processing for restoring only a parameter determined at cold boot, it is finished in a short time.

In block 235, the primary OS 103 obtains the right of access to the CPU 11 to make a transition to the active state, while the secondary OS 111 makes a transition to the sleep state. When the primary OS 103 makes a transition to the active state, the user may execute the primary OS 103 and the application 105 to do computer work. At this time, even if the primary OS 103 or the application 105 is infected by a malware or damaged, since access to the auxiliary memory 25 is prevented, the memory image of the secondary OS 111 in the sleep state will be protected from the primary OS 103 in the active state.

In block 237, the user inputs a switching event from the input device 35 to make a transition to the operating environment of the secondary OS 111. In block 239, the primary OS 103 sets the boot flag [1] indicative of warm boot in the register 31a of the EC 31, sets the resume flag [1] indicative of suspend and quick resume in the register 31b, and sets, in the register 31c, the environment flag [1] indicative of making a transition of the operating environment to the secondary OS 111 to make a transition to the suspend state. In block 241, the secondary OS 111 obtains the right of access to the CPU 11 to make a transition to the active state, while the primary OS 103 makes a transition to the sleep state. Then, the procedure returns to block 231.

According to the above-mentioned procedure, the primary OS 103 and the secondary OS 111 make transitions in such a manner that, when one makes a transition to the active state, the other makes a transition to the sleep state. Then, the main memory 13 or the auxiliary memory 25 that stores the memory image in the sleep state cannot be accessed from the physical address space in the active state. Three or more OSs may create different operating environments.

In the embodiment, when an OS generates a switching event in block 209, there is a need to modify only the portion. Since the other portions do not need to be modified, the generation of the switching event may be realized by rewriting only the BIOS 101. Further, although the auxiliary memory 25 needs to be newly prepared, there is no need to change or add main hardware components of the computer 10. In the order of booting, the secondary OS 111 may precede. In this case, when the boot of the entire system is completed, a transition to the operating environment of the primary OS 103 is made.

The operating environment of the primary OS 103 faces a danger through a network. Since the auxiliary memory 25 that stores the memory image of the secondary OS 111 cannot be accessed from the primary OS 103, the operating environment of the secondary OS 111 may be made more secure than the operating environment of the primary OS 103. The BIOS 101 may set the Ethernet (registered trademark) controller 55 to disabled before transferring the access right to the secondary OS 111 so that any program cannot access the network in the operating environment of the secondary OS 111.

If data processed in the operating environment of the secondary OS 111 are isolated from the operating environment of the primary OS 103, the security of the data can be improved. Therefore, the BIOS 101 may set the SATA controller 53 and the USB controller 55 to disabled before transferring the access right to the secondary OS 111. In this case, data in the operating environment of the secondary OS 111 can be neither stored in the HDD 27 accessible from the operating environment of the primary OS nor stored in an external USB memory used by connecting to a connector provided in a chassis, and this can prevent the leakage of the data.

The data processed in the operating environment of the secondary OS 111 may be stored in the nonvolatile memory accessible only from the operating environment of the secondary OS 111. The method of configuring the PCIe controllers through the BIOS 101 may be changed by the user on a BIOS setup screen. When the PCIe controllers set to disabled, such as the memory controllers 43 and 51, in order to ensure the security are set to enabled, a password may be requested from the user.

Figure 7:
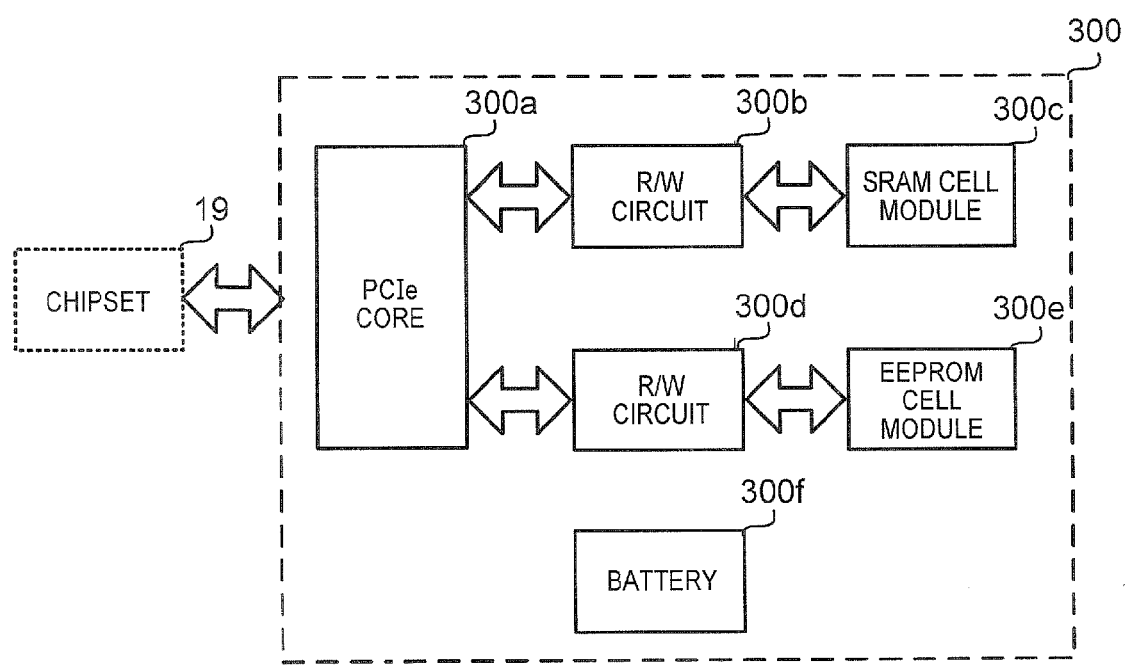
FIG. 7 is a functional block diagram showing the configuration of an auxiliary memory 300.

Although embodiments described above teach by way of example the auxiliary memory 25 mounted inside the computer chassis, the auxiliary memory 25 may be of any type, including a removable type used by attaching it to a connector formed on the surface of the chassis. FIG. 7 is a functional block diagram for describing the configuration of a removable auxiliary memory 300. The auxiliary memory 300 is functionally different from the auxiliary memory 25 in that an EEPROM cell module 300e, a R/W circuit 300d for controlling the operation, and a battery 300f are added. The removable auxiliary memory 300 may provide an operating environment of a common secondary OS 111 isolated from the operating environment of each of primary OSs 103 on multiple computers.

Like the SRAM cell module 25c of the auxiliary memory 25, an SRAM cell module 300c functions to store the secondary OS 111. Programs executed in the operating environment of the secondary OS 111, such as the secondary OS 111 and the application 113, may be stored in the EEPROM cell module 300e. The BIOS 101 sets the auxiliary memory 300 as a boot device. When booting the computer 10, the BIOS 101 first loads the primary OS 103 from the HDD 27 into the main memory 13, and then performs suspend and quick resume to change the boot device to enable the secondary OS 111 to be loaded from the EEPROM cell module 300e into the SRAM cell module 300c.

The battery 300f is used to maintain the memory of the SRAM cell module 300c while the computer 10 is in the suspend state and when the auxiliary memory 300 is removed. A nonvolatile MRAM cell module may be employed instead of the SRAM cell module 300c. Since the memory of the SRAM cell module 300c is maintained by the battery 300f, the operating environment of the secondary OS 111 may be added by Plug and Play when the auxiliary memory 300 is removed from the computer 10 and connected to another computer in operation.

While the present invention has been described with reference to the specific embodiment shown in the accompanying drawings, the present invention is not limited to the embodiment shown in the drawings. It is needless to say that any known configuration may be employed as long as the configuration has the effects of the present invention.

What is claimed is:

1. A computer, comprising:
   a processor capable of executing a first operating system or a second operating system;
   a first random access memory for loading the first operating system;
   a second random access memory connected to a different controller from the first random access memory to load the second operating system;
   a system firmware that:
   resumes the computer from is a suspend state;

transitions the one of first operating system and the second operating system from a sleep state to an active state in response to the computer being resumed from the suspend state; and transitions the other of the first operating system and the second operating system from an active state to a sleep state in response the computer being resumed from the sleep state.

2. The computer of claim 1, further comprising code that, when the computer is resumed from a suspend state, causes the computer to make a transition of the second operating system to the active state while making the transition of the first operating system to the sleep state.

3. The computer of claim 1, further comprising
a second controller for controlling operation of the second random access memory; and
wherein the system firmware causes the computer to block access to the second controller from the first operating system while making the transition of the first operating system to the active state.

4. The computer of claim 3, wherein the second controller comprises a memory controller embedded in a chipset connected to the processor.

5. The computer of claim 3, wherein the system firmware causes the computer to block access to the second controller when the computer is booted from a power-off state.

6. The computer of claim 3, further comprising
a first controller for controlling operation of the first random access memory; and
wherein the system firmware causes the computer to function to block access to the first controller from the second operating system while making the transition of the second operating system to the active state.

7. The computer of claim 5, wherein the first controller is a memory controller embedded in the processor.

8. The computer of claim 5, wherein when the computer is resumed from the suspend state, the system firmware causes the computer to function to block access to the first controller.

9. The computer of claim 1, wherein when the computer is resumed immediately from the suspend state, the system firmware causes the computer to function to make transitions of the first operating system and the second operating system in such a manner that one makes a transition to the active state and the other makes a transition to the sleep state.

10. The computer of claim 1, further, comprising:
an interface enabling connection of a removable memory module including a second random access memory into which the second operating system is loaded; and
code that, upon resuming from a suspend state, causes the computer to function to transfer a right of access to the processor to the first operating system while maintaining a memory image of the second operating system in the second random access memory.

11. The computer of claim 10, wherein the memory module includes a nonvolatile memory for storing the second operating system, and the second operating system is loaded from the nonvolatile memory.

12. The computer of claim 1, further comprising:
a plurality of peripheral devices capable of being accessed from the first operating system and the second operating system; and
code that, when the second operating system is in the active state, prevents access to any peripheral device selected from among the plurality of peripheral devices.

13. The computer of claim 12, further comprising code that causes the computer to prevent access to the second random access memory from the first operating system when the first operating system is in the active state.

14. A method, comprising:
connecting, to the first computer, a memory module including a second random access memory and a nonvolatile memory;
loading a first operating system into a first random access memory;
loading a second operating system into the second random access memory while maintaining a memory image of the first operating system in the first random access memory;
switching an operating system executing on a processor, wherein switching the operating system comprises:
transitioning one of the first operating system and the second operating system to an active state in response to the first computer resuming from a suspend state; and
transitioning the other of the first operating system and the second operating system into a sleep state upon the first computer resuming from the suspend state.

15. The method of claim 14, wherein the second operating system is stored in nonvolatile memory and data generated in an operating environment of the second operating system are also stored in the nonvolatile memory.

16. The method of claim 14, further comprising transferring a right of access to a processor to the second operating system, upon resuming from a suspend state.

17. The method of claim 14, further comprising:
disabling a channel to the first random access memory from the second operating system; and
disabling a channel to the second random access memory from the first operating system.

18. The method of claim 14, further comprising:
removing the memory module from the first computer while maintaining a memory of the second random access memory; and
connecting the memory module to a second computer.

19. The method of claim 14, further comprising preventing access to a peripheral device when the second operating system is in the active state.

20. A program product comprising a non-transitory computer readable storage medium that stores code executable by a processor to perform:
loading the first operating system into a first random access memory;
loading the second operating system into a second random access memory connected to a different controller from the first random access memory;
closing a channel to the first random access memory in response to transferring a right of access to the processor to the second operating system and maintaining a memory image of the first operating system stored in the first random access memory; and
closing a channel to the second random access memory in response to transferring the right of access to the processor to the first operating system and maintaining a memory image of the second operating system stored in the second random access memory.

* * * * *